(12) United States Patent
Baker

(10) Patent No.: US 7,289,613 B2
(45) Date of Patent: Oct. 30, 2007

(54) TECHNIQUE FOR SELECTING A PROFILE TO USE TO SERVICE A CALL

(75) Inventor: Nathan Bryant Baker, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 545 days.

(21) Appl. No.: 10/713,806

(22) Filed: Nov. 13, 2003

(65) Prior Publication Data

US 2005/0117725 A1    Jun. 2, 2005

(51) Int. Cl.
*H04M 15/00* (2006.01)
*H04M 3/42* (2006.01)

(52) U.S. Cl. .............................. 379/114.21; 379/218.01
(58) Field of Classification Search ........... 379/114.21, 379/218.01
See application file for complete search history.

(56) References Cited

U.S. PATENT DOCUMENTS

| 5,586,175 | A  | * | 12/1996 | Hogan et al. | 379/114.14 |
| 6,356,876 | B1 | * | 3/2002  | Lingham      | 705/14     |
| 7,013,290 | B2 | * | 3/2006  | Ananian      | 705/27     |
| 7,080,049 | B2 | * | 7/2006  | Truitt et al.| 705/75     |
| 7,099,652 | B2 | * | 8/2006  | Brown et al. | 455/406    |

* cited by examiner

*Primary Examiner*—Rasha S. Al-Aubaidi
(74) *Attorney, Agent, or Firm*—Kaye Scholer LLP

(57) ABSTRACT

A telephone call may have more than one identifier, e.g., a billing telephone number and a caller's telephone number, within its signaling stream. Each identifier may have an associated call servicing profile. The invention determines which of several call profiles associated with identifiers within the call signaling stream should be used to service the call. The invention involves reading the identifiers, retrieving the profiles associated with the identifiers, if they exist, and selecting one of the profiles to use based on data in the profiles and a profile priority scheme. The invention may be realized in relation to an information assistance service.

21 Claims, 4 Drawing Sheets

TECHNIQUE FOR SELECTING A PROFILE TO USE TO SERVICE A CALL

BACKGROUND OF THE INVENTION

The invention relates generally to an information assistance system and method. More specifically, the invention relates to a system and method for determining which user profile to use to service a call, e.g., by an information assistance service.

In a typical directory assistance call, a caller identifies to an operator the name and address (sometimes city or area code) of a party whose telephone number is desired. In response, the operator locates the desired destination telephone number using, e.g., a computer database. The destination number is then provided to the caller, e.g., by a voice server which provides automated voicing of the number, and the caller is afforded an option to be connected to the destination number without the need of first terminating the directory assistance call.

Information assistance is an extension of directory assistance. In addition to connecting a caller to a destination number, information assistance operators can provide concierge-type services such as a restaurant guide and reservation service, event ticketing and reservation service, hotel reservation and availability service, travel or flight reservation and ticketing services, ordering specific items such as flowers or food delivery, arranging transportation, and accessing entertainment guides. The use of information assistance to provide such concierge-type services is disclosed, e.g., in commonly-assigned, co-pending U.S. application Ser. No. 09/520,306, "Technique for Providing Information Assistance Including Concierge-Type Services," filed Mar. 7, 2000, incorporated herein by reference.

In addition, information assistance service subscribers may use an information management service to retain information folders, such as contacts folders (also known as private directories), appointments folders (also known as calendars), to-do lists, and notes. A caller may access a contacts folder to connect to a desired contact, retrieve an appointment or to-do list item, or set up a new contact, appointment, or to-do list item. A contacts folder contains contact information, such as telephone number, postal address, and e-mail address, for people and/or organizations. Each of the user's contacts includes at least a telephone number, and likely includes an associated name, which may be a full or real name of the contact (e.g., Joseph Johnson) or may be a nickname or alias (e.g., Joe or "JJ"). The associated address may be a full address, including number, street, city, state, postal code, and country, or may be a partial address, e.g., only including a street name or a city. A user may have separate contacts folders for different purposes, such as a personal contacts folder, a business contacts folder, a sports team contacts folder, etc. These folders are stored in a database accessible to an information/call center and its operators. The user may have specific rights with respect to a folder, e.g., owner, administrator, read-only, etc. When the user accesses a folder through an operator, the operator becomes an alter ego of the user and is subject to the same rights as the user with respect to the folder. The user may create, maintain, or access a contacts folder via the Internet or other communications means, or through an operator who in turn may create, maintain, or access the folder on behalf of the user. The user may be identified by ANI (automatic number identification) or, alternatively, by, or in combination with, a user identification (ID), password, PIN, mother's maiden name, user voice recognition, user voiceprint, etc. The use of information assistance to provide these types of information management services and to maintain the folders is disclosed, e.g., in U.S. Pub. No. 2002/0055351 A1, published May 9, 2002, incorporated herein by reference.

Moreover, if a caller subscribes to an information assistance service, the information assistance service may develop one or more user profiles that include information pertaining to and about the caller, including preferences for handling calls from the caller and methods of identifying the caller based on the caller's telephone number, voiceprint, PIN (personal identification number), etc. These profiles may also include the caller's personal preferences about restaurants, movies, sporting events, or hobbies. U.S. Pub. No. 2002/0055351 A1 also discloses the use of more than one profile associated with a user, including a hierarchy of profiles identified by a user's telephone number, e.g., ANI. The highest profile in the hierarchy may be the user's personal profile, but other profiles may be associated with the user, such as those associated with, e.g., the user's long-distance carrier, the regional information/call center to which the user has been connected, the geographic market from which the user is calling. Preferences in a profile at a higher level, e.g., the user's personal profile, take precedence over conflicting preferences in a profile at a lower level, e.g., the geographic market profile.

Telephone systems use a variety of signaling protocols to establish telephone calls across telephone lines owned by different entities. One of these protocols, Feature Group D (FG-D), defines interconnection rules between a local exchange carrier (LEC) and an inter-exchange carrier (IEC or long-distance carrier). FG-D services route inter-LATA calls to the IEC point of termination, route calls with a carrier access code to the user's carrier, and pass information to the carrier. Information passed includes the caller's number, through ANI.

In certain environments, e.g., a corporate environment, there may be multiple employees each having a different telephone number, but all of the calls from all of the telephone numbers are billed to a single, corporate number called the "billing telephone number" (BTN). This type of environment may occur if the corporate entity uses, e.g., a Centrex system. This type of multiple-phone environment may also occur in a residential setting if there are multiple phone lines in the residence, yet all are billed to a single number.

Unlike FG-D, which can only pass one call identifier, such as the caller's ANI, more advanced signaling systems can pass multiple call identifiers, e.g., the BTN and the ANI, which is helpful in keeping track of details used to bill telephone calls across telephone lines controlled by different entities. One such advanced signaling system is "SS7" (Signaling System 7), which may also be referred to as "C7," "Common Channel Signaling System No. 7," or "CCSS7." SS7 is a global standard for telecommunications defined by the International Telecommunication Union. The standard defines the procedures and protocol by which network elements in the public switched telephone network (PSTN) exchange information over a digital signaling network to effect wireless (cellular) and wireline call setup, routing, and control. Similarly, for VoIP (voice over IP (Internet Protocol)) calls, a session initiation protocol (SIP) may be used to establish and terminate a VoIP call session. The SIP also has the ability to pass more than one call identifier. For details on the SIP, one may refer, e.g., to "SIP: Protocol Overview" (2001), available at www.radvision.com, a website associated with Radvision Ltd. located in Fair Lawn, N.J.

SUMMARY OF THE INVENTION

Using a protocol that passes both the ANI and the BTN through the telecommunications network allows for improvements over the prior art information assistance service. In particular, the method of the invention receives a signaling stream associated with the call, which signaling stream includes at least first and second identifiers, e.g., BTN and ANI, where the first identifier contains data concerning an account to which the call is to be billed. The method maintains first and second profiles, e.g., a BTN profile and an ANI profile, identifiable by these first and second identifiers, and retrieves the first profile based on the first identifier. Based on data in the first profile, the method determines whether to use the first profile or the second profile.

The data in the first profile may explicitly preclude or allow the second profile to be used. If it allows the second profile to be used, the method may select the second profile if the second identifier differs from the first identifier and the second profile exists. If the second identifier and the first identifier are the same, the method selects the first profile to be used. The method also selects the first profile if the data allows the second profile to be used, but no second profile exists.

In an aspect of the invention, the signaling stream is formatted in accordance with the SS7 protocol. In another aspect of the invention, the call content is formatted according to a VoIP protocol and the signaling stream is formatted according to SIP.

A system according to the invention is provided. The system includes an interface for receiving the signaling stream associated with the call to be serviced, a database for maintaining first and second profiles identifiable by the first and second identifiers in the signaling stream, and a processor for retrieving the first profile based on the first identifier and, based on data in the first profile, for determining whether to use the first profile or the second profile. The first identifier contains data concerning an account to which the call is to be billed, e.g., the BTN, and the second identifier may be the ANI.

Advantageously, the invention allows an account administrator to specify how the account is to be billed and which of several possible servicing profiles may be used to service a call based on priority of the profiles.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The present invention is directed to determining which of several call profiles associated with a user should be used to service a call. The invention is premised upon the recognition that certain call set-up signals, e.g., in accordance with the SS7 protocol, may contain multiple identifiers, e.g., ANI and BTN, associated with a user. In accordance with the invention, each of the identifiers may used to identify a different profile associated with the user, e.g., an ANI profile and a BTN profile. The invention involves reading the identifiers, retrieving the profiles associated with the identifiers, if they exist, and selecting one of the profiles to use based on data in the profiles and a profile priority scheme. The invention may be realized in relation to an information assistance service, which call environment is illustratively described below.

An expansive network of information/call centers may be used from which operators can effectively provide users with personalized information and communications services. Such services may include, e.g., providing directory information, movie listings, restaurant recommendations, driving directions to various places, etc.; making reservations; sending invitations; administering appointment calendars; ticketing; and conducting other transactions for the users. The term "operator" used herein broadly encompasses entities that are capable of providing information assistance in a telecommunications environment, including, without limitation, human operators, voice response/recognition capabilities, web-/WAP-enabled operator services, and other automated and electronic access.

Figure 1:
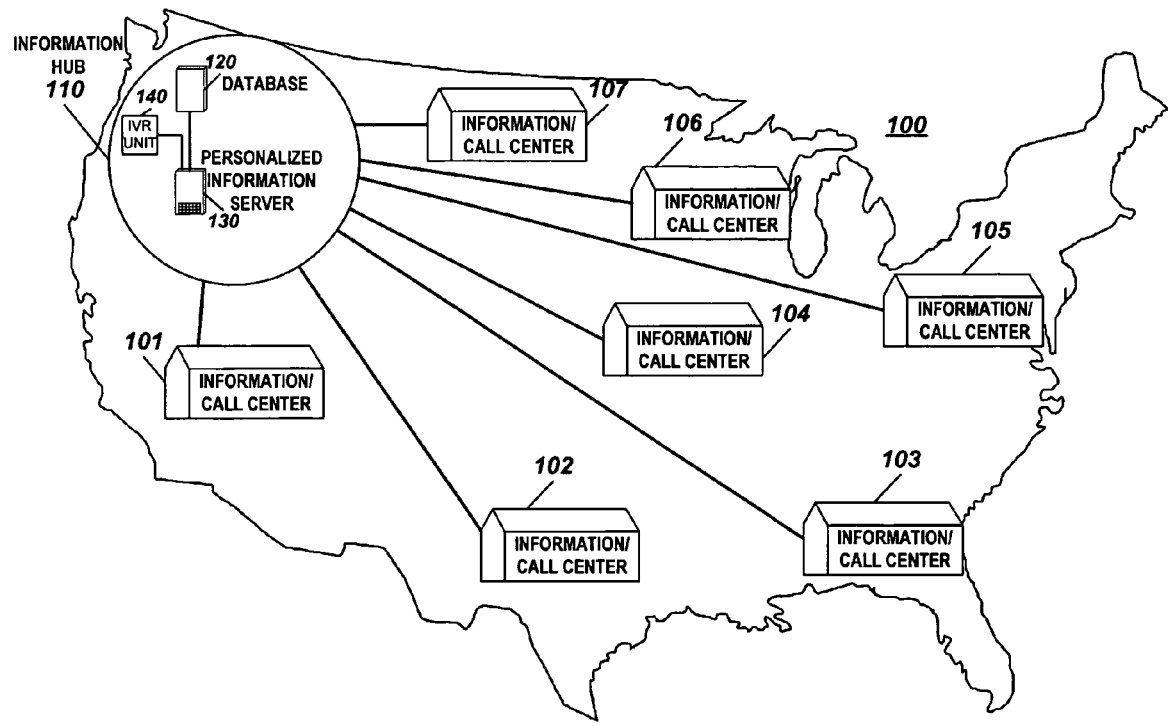
FIG. 1 illustrates a communications system including information/call centers in accordance with an embodiment of the invention.

FIG. 1 illustrates a system embodying aspects of the invention, which includes wide area network (WAN) 100 covering an extensive area. WAN 100 can be an intranet-based network or an Internet-based network such as the World Wide Web. In this illustrative embodiment, WAN 100 connects operators dispersed throughout a wide coverage area in information/call centers 101-107. Each of information/call centers 101-107 covers one or more regional coverage areas. One or more information hubs 110 are also included in WAN 100. An information hub 110 includes one or more personalized information servers 130 which are accessible by the operators in the system and one or more databases 120 in which users' contacts, appointments, and other folders and information are stored and maintained. Information hub 110 may also include interactive voice response (IVR) unit 140 connected to server 130 for interacting with the user by voice, e.g., announcing to the user selected appointments. In addition to storing folders and information in information hub 110, they may also be stored locally at one or more of the information/call centers. The folders and information at different centers are synchronized. Synchronized databases provide necessary backup as well as support to roaming mobile device users.

In operation, a user dials a designated access number, e.g., "411," "*555," "555-1212," "00," etc., and the call is routed to, say, information/call center 101 where an operator attends to the call. As described above, the user may be identified by ANI or, alternatively, by, or in combination with, a user ID, password, PIN, mother's maiden name, user voice recognition, user voiceprint, etc. In the invention, using a signaling system that passes more than one identifier, the user may also be identified by, e.g., BTN. In the case in which the user desires an information assistance service, such as a directory assistance, information management, or concierge-type service, the user makes such a request to the operator and the operator accesses personalized information server 130 through WAN 100 (or alternatively via the Internet). In response, server 130 presents on the operator's terminal various graphical user interface (GUI) dialog boxes, e.g., "login" (for confirming the user's identity via user ID and password), "home" (listing the user's contacts, appointments, and other folders), "edit" (for editing specific folder contents), and "view" (for viewing folder contents), for interacting with the operator.

Figure 2:
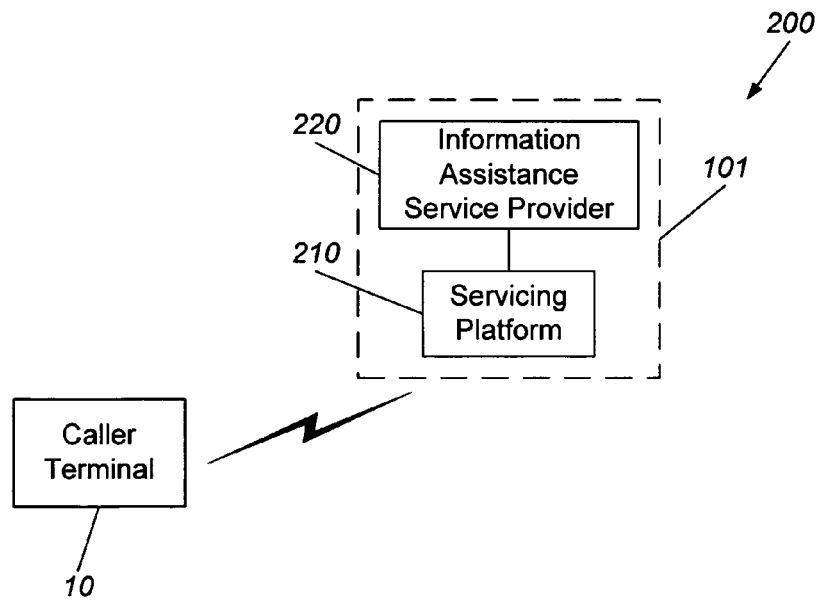
FIG. 2 illustrates an arrangement including a caller terminal and an information/call center in accordance with an embodiment of the invention.

FIG. 2 illustrates system 200 in which a caller initiates an information assistance call from caller terminal 10, which is routed to, say, information/call center 101 via one or more carrier switches in a carrier network, e.g., the PSTN, a wireless telephone network, etc. Information/call center 101 generically represents any of the aforementioned information/call centers 101-107 shown in FIG. 1. Caller terminal 10 may comprise a wireless telephone, wireline telephone, personal digital assistant (PDA), computer, or other communication device. In this illustrative embodiment, users may dial, speak or otherwise communicate predetermined access digits, access codes or retail numbers, or input a predetermined address or URL (uniform resource locator) established by the carrier to access information/call center 101. In the example described above, the predetermined access digits may be "411," "*555," "555-1212," "00," etc. Once connected to information/call center 101, the user requests information assistance.

Figure 3A:
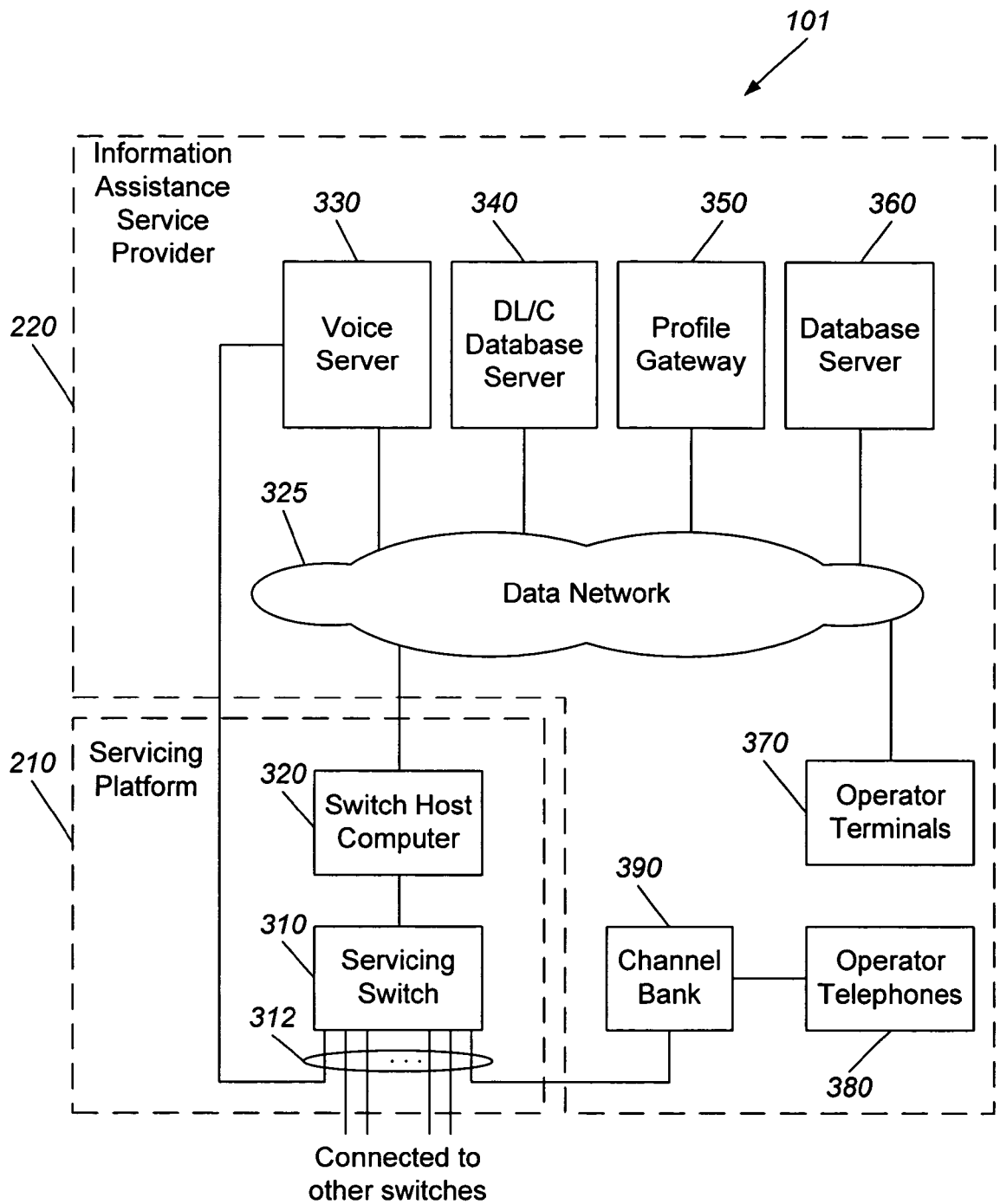
FIG. 3A illustrates an information assistance service provider and a servicing platform for providing an information assistance service.

FIG. 3A illustrates information/call center 101, which may be configured to include information assistance service provider 220 together with servicing platform 210. It should be noted that even though both provider 220 and servicing platform 210 appear in the same figure, they may or may not be located in the same geographic area. Servicing platform 210 includes servicing switch 310 having T1 spans 312 or connections by other means for connection to one or more voice servers 330 (although only one is shown in the figure), channel bank 390, and one or more carrier networks. In an alternate embodiment, voice information may be packetized and transmitted pursuant to a VoIP protocol over a packet-switched network, e.g., the Internet, to information/call center 101. Servicing switch 310 may receive an incoming information assistance call from a carrier switch in a carrier network. Servicing switch 310 may also be used to place an outgoing call onto a carrier network, which may be different from the carrier network used for the incoming call.

Channel bank 390 in service provider 220 is used to couple multiple operator telephones 380 to servicing switch 310. The operators in information/call center 101 are further equipped with operator terminals 370, each of which includes a video display unit and a keyboard with an associated dialing pad. Operator terminals 370 are connected over data network 325 to one or more database servers 360 (although only one is shown in the figure). Operators may use database server 360 to provide information assistance including searching various databases in a manner described below to satisfy a caller's request. Other information assistance concerning restaurant recommendations, movie listings, events, etc. may also be provided by searching one or more internal and external databases, and the Internet. Switch host computer 320 and voice server 330 are also connected to data network 325. By way of example, data network 325 includes a local area network (LAN) supplemented by a number of point-to-point data links. Through data network 325 and routers (not shown), components of information/call center 101 may also be connected to the Internet or other wide area networks (WANs).

Servicing switch 310 is conventional and supports digital T1 or perhaps other connectivity. The operation of servicing switch 310 is governed by instructions stored in switch host computer 320. In this illustrative embodiment, servicing switch 310 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, voice recognizers, dual-tone multi-frequency (DTMF) generators/detectors, or conference units, depending on the demand placed on information/call center 101 and servicing switch 310 for each corresponding function.

An incoming call requesting information assistance is received by servicing switch 310 in information/call center 101, which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 320 or elsewhere in information/call center 101. In other instances, other distribution logic schemes may be utilized, such as skills-based routing or a priority scheme for preferred users. In a preferred embodiment, the signaling associated with an information assistance call for establishing the call is in accordance with the SS7protocol. When the call signaling is received by servicing switch 310 in information/call center 101, switch 310 derives, in a well-known manner, from the call signaling the caller's phone number from which the call originates (ANI) and the number to which the telephone call should be billed (BTN). These two numbers may be the same, but in a corporate environment or in a residence having multiple phone lines, the BTN and ANI are likely different.

Voice server 330 (also known as a "voice response unit" or "VRU") is used to play the constant repeated parts of an operator's speech, namely, the various greetings and signoffs (or closings) as well as other information portions of a call. Voice server 330 is connected via data network 325 to switch host computer 320 and via one or more T1 spans 312 to servicing switch 310. Voice server 330 may comprise a general-purpose computer and one or more voice cards for voice recognition, voice recording and playback, and call progress analysis. At appropriate stages in a call progression, switch host computer 320 initiates a voice path connection between voice server 330 and servicing switch 310 such that the user, or the user and the operator, are able to hear whatever pre-recorded speech is played on that connection by voice server 330. Computer 320 then instructs voice server 330, via data network 325, what type of message to play, and passes data parameters that enable voice server 330 to locate the message appropriate to the call state.

Data network 325 may further connect to directory listing/concierge (DL/C) database server 340. DL/C database server 340 may contain directory listing information on restaurants, events, accommodations, transportation, travel information and booking, stock prices, weather, and other services such as grocery or flower delivery, etc. Together, DL/C database server 340 and database server 360 provide operators with the means to search for a caller's desired party and determine the appropriate telephone number. Preferably, these databases can search not only by name and address, but also by type of goods/services and/or geographical region, or by any other attribute in the caller record, including phone number. For example, DL/C database server 340 can answer queries soliciting the names/numbers of restaurants serving a desired cuisine on a given street.

Data network 325 may also connect to a profile gateway 350. Profile gateway 350 provides access to a user profile, which may include personal information and the subscriber's preferences. Such personal information and preferences may include the subscriber's phone number, fax number, e-mail address, preferred restaurant and dining time, preferred mode of delivery of information to him/her, dietary requirements, likes and dislikes, past logged activities, specific service subscriptions, etc. When the information assistance call is received by servicing switch 310 in information/call center 101, switch 310 derives the aforementioned ANI and BTN from the call setup signaling associated with the call. Switch host computer 320 then requests via profile gateway 350 any profile identified by such an ANI and BTN.

Figure 3B:
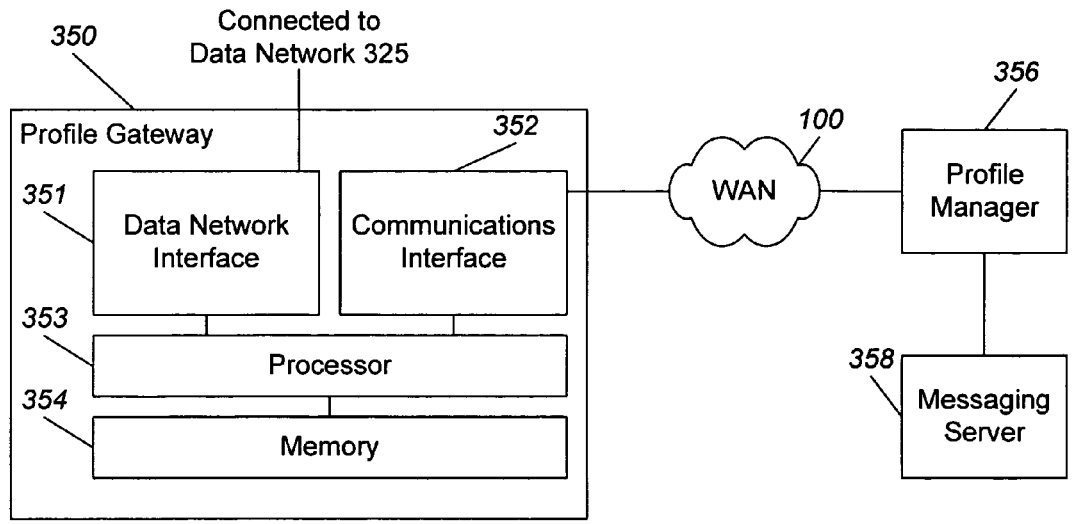
FIG. 3B illustrates an arrangement for providing personalized information and communications services to a user based on a user profile in accordance with an embodiment of the invention.

An embodiment of profile gateway 350 is shown in FIG. 3B. This gateway includes data network interface 351, communications interface 352, processor 353, and memory 354. Gateway 350 receives the profile request including the ANI and BTN through data network interface 351. In response to such a request, processor 353 searches memory 354 for the profiles identified by the ANI and BTN. Profile data is input and updated (e.g., via Internet web pages or operator) through profile manager 356, which may be located in information hub 110 in FIG. 1. Copies of the profile data are distributed by profile manager 356 to the profile gateways in various information/call centers (e.g., center 101) connected via WAN 100. In this illustrative embodiment, a master copy of the profiles is kept at profile manager 356. For example, profile gateway 350 initially forwards requests for new profiles to manager 356, and caches copies of the requested profiles from manager 356 in local memory 354 for rapid, subsequent retrieval of the profiles. Memory 354 here generically includes disks, caches, and volatile and nonvolatile memories. When a particular profile in gateway 350 is updated at manager 356, the latter notifies gateway 350 that the particular profile is expired. If processor 353 determines that the requested profile cannot be found in memory 354 or the requested profile is expired, processor 353 forwards the profile request to manager 356 through communications interface 352. In response, manager 356 provides to gateway 350 any latest profile identified by the ANI and/or BTN. Otherwise, processor 353 retrieves from memory 354 any available, unexpired profile identified by the ANI and/or BTN. When the operator answers the call, computer 320 communicates to components in information assistance service provider 220 and, in particular, the operator through terminal 370 any profile data pertinent to the handling of the call.

Figure 4A:
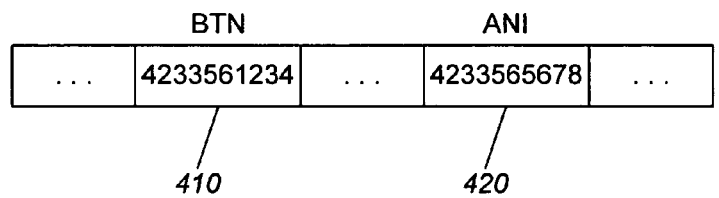
FIG. 4A illustrates signaling fields associated with a telephone call in accordance with an embodiment of the invention.

FIG. 4A illustrates signaling fields associated with a telephone call in accordance with the SS7 protocol. Fields that may be included in the signaling are, among others, BTN 410 and ANI 420. BTN 410 and ANI 420 include the billing telephone number and automatic number identification, here shown as 423-356-1234 and 423-356-5678, respectively, although the BTN and ANI may be the same, for example if the caller only has one telephone number. BTN and ANI may be different if a caller has more than one telephone number, such as a business or residence with multiple lines and wants to bill all charges associated with the multiple lines to the same number.

Figure 4B:
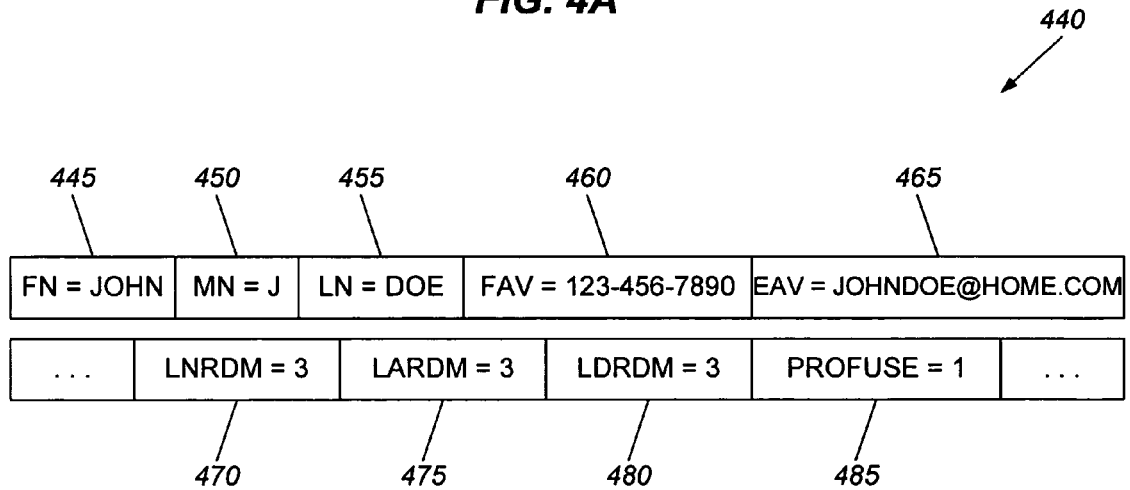
FIG. 4B is a schematic diagram of a user profile in accordance with an embodiment of the invention.

FIG. 4B illustrates the format of BTN profile 440 in accordance with an embodiment of the invention. In general, a generic profile comprises a string of identifiers, each of which is accompanied by a defined value. Such a profile may serve to provide information about the user and his/her preferences. As shown in FIG. 4B, BTN profile 440 includes fields for first name (FN field 445); middle name or initial (MN field 450); last name (LN field 455); user's facsimile number (FAV field 460), e.g., "123-456-7890"; user's e-mail address (EAV field 465), e.g., "johndoe@home.com"; user's preferred methods of delivery of a listing number (LNRDM field 470), listing address (LARDM field 475), and listing details (LDRDM field 480) (each of which specifies a value of 3, for e-mail delivery); and whether other profiles may be used (PROFUSE field 485), where a value of 1 means other profiles may be used, and a value of 0 means no other profiles may be used. It should be noted that content delivery methods other than e-mail, e.g., facsimile, SMS (short message service) and/or WAP may be specified in fields 470, 475, and 480 of BTN profile 440. It should also be noted that BTN profile 440 may be used to specify not only methods of delivery of different parts of listing information, but also whether the multiple delivery methods occur simultaneously. Further, BTN profile 440 may be used to specify whether, after the content delivery is initiated, the user-caller should be handed off to VRU 330 or the operator to be informed of the delivery status. Although BTN profile 440 may define the content delivery options, the operator, at the request of the user, may elect other alternative or additional delivery methods, overriding the previously defined option. For that matter, the user may always request the operator to change or temporarily override different defined options in BTN profile 440, subject to a necessary security check on the user. In an alternative embodiment, BTN profile 440 may be realized in well-known extensible markup language (XML).

In particular, PROFUSE field 485 specifies whether other profiles may be used. Thus, in an example in which a corporation has many telephone lines but only one billing telephone number, there may be a single "BTN profile" associated with the BTN and there may be many profiles associated with the employees of the company based on the specific telephone numbers from which they make calls ("ANI profiles"). In the BTN profile, the corporation may specify that it wants all calls originating from the corporation (and having the corporation's BTN in its signaling stream) to use the BTN profile. In such a case, PROFUSE field 485 would equal 0. A value of PROFUSE in the BTN profile equal to 1 means that a caller's profile (ANI profile) may be used to service the call, if the ANI profile exists. In this particular embodiment, an ANI profile may take a form similar to BTN profile 440, except the ANI profile does not have PROFUSE field 485.

A similar scenario may exist with respect to residential phone numbers. In a residence having more than one telephone number, e.g., a main number and one for the children, the BTN may be the main number and may have its own profile. The BTN profile may have a PROFUSE field 485 equal to 0, preventing other profiles from being used.

Figure 5:
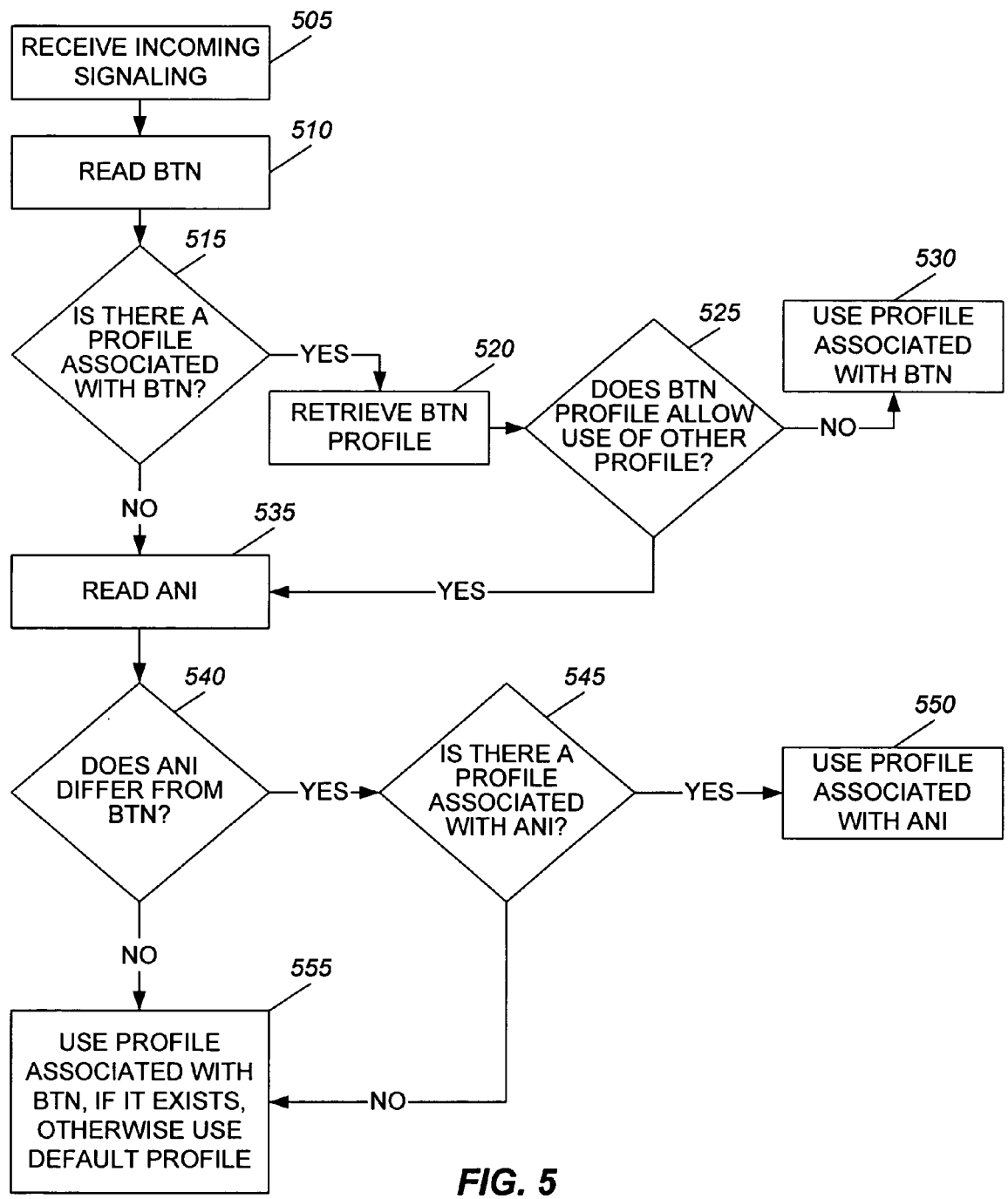
FIG. 5 illustrates a routine for searching for information and transferring it to an information depot in accordance with an embodiment of the invention.

FIG. 5 is a flowchart illustrating how a profile may be selected in order to service a telephone call made to an information assistance service. The flowchart uses the scenario described above, that of a corporation having one BTN and many ANIs. Each call, however, includes both a BTN and an ANI. When a call comes in from a caller to the information assistance service, the service derives the BTN and looks for a BTN profile. If there is a BTN profile, the service looks to PROFUSE field 485 to determine if other profiles may be used. If PROFUSE=0, the service uses the BTN profile. If PROFUSE=1, the service derives the ANI and looks for an ANI profile, and uses that profile if it exists, otherwise it uses the BTN profile. In the event there is no BTN profile, the service uses the ANI profile, if it exists, or a default profile if no BTN or ANI profile exists.

More specifically, in step 505 information/call center 101 receives an incoming signaling stream. In step 510, switch 310 derives the BTN from the signaling stream, and switch host computer 320 then requests via profile gateway 350 any profile identified by the BTN. Step 515 asks if a BTN profile exists. If so, switch host computer 320 retrieves the BTN profile in step 520 and reads the profile. Step 525 asks whether the BTN profile allows use of other profiles. This is done by reading PROFUSE field 485. If PROFUSE field 485=0, no other profile is allowed and in step 530, the call center uses the BTN profile to service the call.

If PROFUSE field 485=1, other profiles are allowed. In that case, in step 535, switch 310 derives the ANI from the signaling stream. Step 540 asks whether the ANI differs from the BTN. The ANI and the BTN will be the same if there is only one telephone number for the corporation or residence, or if the main number is used to make a telephone call. If the ANI and the BTN are the same, then in step 555 the call center uses the BTN profile to service the call (because step 525 found that a BTN profile exists). If the ANI and BTN differ, switch host computer 320 requests via profile gateway 350 any profile identified by the ANI. Step 545 asks if an ANI profile exists. If so, in step 550, the call center uses the ANI profile to service the call. If no ANI profile exists in step 545, in step 555 the call center uses the BTN profile to service the call (because step 525 found that a BTN profile exists).

If, in step 515, no BTN profile exists, in step 535, switch 310 derives the ANI from the signaling stream, just as in the case when a BTN profile exists and allows other profiles to be used. Step 540 then asks whether the ANI differs from the BTN. If the ANI and the BTN are the same, then in step 555 the call center uses a default profile to service the call (because step 525 found that no BTN profile exists). If the ANI and BTN differ, a request is made for an ANI profile. If such a profile exists in step 545, then in step 550, the call center uses the ANI profile to service the call. If no ANI profile exists in step 545, in step 555 the call center uses the default profile to service the call (because step 525 found that no BTN profile exists).

The scenario illustrated in FIG. 5 assumes that the BTN profile has priority over any of the ANI profiles having the same BTN. However, the priority scheme could be to use the ANI profile, if it exists, and see if that profile allows the use of any other profiles (i.e., if PROFUSE=1). If so, then the BTN profile, if it exists, could be used. Otherwise, the ANI profile would be used. If no ANI profile exists, the BTN profile would be used, if it exists, otherwise the default profile would be used.

FIG. 5 only shows priority between two separately identified user profiles, but there may also be more user profiles identifiable by identifiers other than the ANI and BTN in the call signaling stream. For example, there may be identifiers in the signaling stream that identify the user's long-distance carrier (IEC) or local carrier (LEC) or the geographic market from which the user is calling (e.g., by using the caller's area code). Each of these identifiers may also be used to identify a user profile. Once these profiles are accorded priority, the highest-priority profile (e.g., BTN profile) is retrieved, and if it exists it is queried as to whether any other profiles are allowed. If not, the highest-priority profile is used. If other profiles are allowed, however, the next-highest-priority profile (e.g., ANI profile) is retrieved and, if it exists, it is queried as to whether any other profiles are allowed. If not, this second-in-priority profile is used. If the second-in-priority profile allows other profiles to be used, the third-in-priority profile (e.g., IEC profile) is retrieved and, if it exists, it is queried as to whether any other profiles are allowed. This sequence is followed for each subsequent-priority profile.

Additional advantages and modifications of the invention will readily occur to those skilled in the art. For example, the voice content of a call may be formatted according to a VoIP protocol, and establishment and termination of the VoIP call is performed via SIP signaling which may contain multiple call identifiers. Each of such call identifiers used may identify a profile. Thus, there may be a BTN and an ANI in the SIP signaling stream, from which BTN and ANI profiles may be identified and retrieved.

Finally, information/call center 101 is disclosed herein in a form in which various functions are performed by discrete functional blocks. However, any one or more of these functions could equally well be embodied in an arrangement in which the functions of any one or more of those blocks or, indeed, all of the functions thereof are realized, for example, by one or more appropriately programmed processors.

Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

What is claimed is:

1. A method for selecting a profile to use in servicing a call, the method comprising:
   receiving a signaling stream associated with the call, the signaling stream including at least first and second identifiers, the first identifier containing data concerning an account to which the call is to be billed;
   maintaining first and second profiles identifiable by the first and second identifiers, respectively, the first profile comprising one or more preferences unrelated to billing and second data indicating whether the first profile or the second profile is to be used to provide one or more services during the call;
   retrieving the first profile based on the first identifier; and
   based on the second data, determining whether to use the first profile or the second profile to provide one or more services during the call.

2. The method according to claim 1, wherein the second data precludes the use of the second profile.

3. The method according to claim 1, wherein the second data allows the use of the second profile.

4. The method according to claim 3, further comprising:
selecting the first profile to provide one or more services during the call if the second identifier is the same as the first identifier.

5. The method according to claim 3, further comprising:
selecting the first profile to provide one or more services during the call if the second identifier differs from the first identifier, but no second profile exists.

6. The method according to claim 3, further comprising:
selecting the second profile to provide one or more services during the call if the second identifier differs from the first identifier and the second profile exists.

7. The method according to claim 1, wherein the signaling stream is formatted in accordance with an SS7 protocol.

8. The method according to claim 1, wherein the content of the call is formatted according to a VoIP protocol and the signaling stream is formatted according to a session initiation protocol (SIP).

9. The method according to claim 1, wherein an information assistance service provides one or more services during the call.

10. A system for selecting a profile to use in servicing a call, comprising:
an interface configured to:
receive a signaling stream associated with the call, the signaling stream including at least first and second identifiers, the first identifier containing data concerning an account to which the call is to be billed;
a database configured to:
maintain first and second profiles identifiable by the first and second identifiers, respectively, the first profile comprising one or more preferences unrelated to billing and second data indicating whether the first profile or the second profile is to be used to provide one or more services during the call; and
a processor configured to:
retrieve the first profile based on the first identifier; and
based on the second data, determine whether to use the first profile or the second profile to provide one or more services during the call.

11. The system according to claim 10, wherein the second data precludes the use of the second profile.

12. The system according to claim 10, wherein the second data allows the use of the second profile.

13. The system according to claim 12, wherein the processor is further configured to:
select the first profile to provide one or more services during the call if the second identifier is the same as the first identifier.

14. The system according to claim 12, wherein the processor is further configured to:
select the first profile to provide one or more services during the call if the second identifier differs from the first identifier, but no second profile exists.

15. The system according to claim 12, wherein the processor is further configured to:
select the second profile to provide one or more services during the call if the second identifier differs from the first identifier and the second profile exists.

16. The system according to claim 10, wherein the signaling stream is formatted in accordance with an SS7 protocol.

17. The system according to claim 10, wherein the content of the call is formatted according to a VoIP protocol and the signaling stream is formatted according to a session initiation protocol (SIP).

18. The system according to claim 10, wherein an information assistance service provides one or more services during the call.

19. A method for selecting a profile to use in servicing a call, the method comprising:
receiving at least first and second identifiers during a call;
maintaining a first profile associated with the first identifier, the first profile comprising billing information and at least one first preference unrelated to billing, and a second profile associated with the second identifier, the second profile comprising one or more second preferences;
retrieving the first profile based on the first identifier;
receiving a request for one or more services;
based on data in the first profile, selecting the first profile or the second profile for providing the one or more requested services during the call; and
providing the one or more requested services in accordance with the selected first or second profile.

20. The system according to claim 19, wherein the at least one first preference includes at least one preference selected from a group consisting of: a preferred mode of delivery of information, a preferred restaurant, a preferred dining time, one or more dietary requirements, past logged activity, and a service subscription.

21. The system according to claim 19, wherein the one or more second preferences include at least one preference selected from a group consisting of: a preferred mode of delivery of information, a preferred restaurant, a preferred dining time, one or more dietary requirements, past logged activity, and a service subscription.

* * * * *